Dec. 14, 1971     K. V. GENTRY     3,626,775

METHOD OF DETERMINING NOTCH CONFIGURATION IN A BELT

Filed Oct. 7, 1970

INVENTOR.
KAY V. GENTRY
BY Raymond Fink
ATTORNEY

United States Patent Office 3,626,775
Patented Dec. 14, 1971

3,626,775
METHOD OF DETERMINING NOTCH CONFIGURATION IN A BELT
Kay V. Gentry, Littleton, Colo., assignor to
The Gates Rubber Company, Denver, Colo.
Filed Oct. 7, 1970, Ser. No. 90,197
Int. Cl. F16g 5/16, 5/00
U.S. Cl. 74—233                                                12 Claims

ABSTRACT OF THE DISCLOSURE

This invention relates to a methematical determination of the parameters established for determining the configuration and spacing of notches in the compression section of power, motion or traction.

BACKGROUND OF THE INVENTION

It has been known for some period of time that notching of the compression section of belts sometimes aids in the relief of the stress concentration of the power transmission belt developed as it undergoes dynamic flexing particularly around the sheave. Such notching tends to relieve the stress concentration thereby minimizing the likelihood of cracking of the compression section. Such a minimization of cracking is generally accompanied by a corresponding increase in the useful life of the belt.

Accordingly, patents such as U.S. Letters Patent No. 2,034,466 to Freelander and U.S. Letters Patent No. 2,065,180 to Freelander have been granted which describe methods of manufacturing a power transmission belt containing such notches in the compression section. These patents, however, do not disclose the considerations which should be given for the determination configuration of the notch itself. U.S. Letters Patent No. 2,625,828 to Nassimbene discloses a configuration of the notch of which the curvature of the central portion of the notch is greater than the curvature of the end portion of the notch. Such a configuration will aid in a relief of stress concentration, thereby decreasing the likelihood of cracking. The current invention, however, described herein is an improvement over U.S. Letters Patent No. 2,625,828 of Nassimbene in that pertinent parameters relating to the notch depth, the apex radius and the spacing of the notches are set forth. The angle of the notch and the dimension of the cog may also be defined. Using such parameters for notch configuration will even further minimize cracking which may occur in the compression section of the belt. The improvement thereby enhances the belt load-life capacity of the power transmission belt. The improvement further enables the belt to be used on smaller diameter sheaves.

To optimize the design of the notch configuration, it is therefore an object of this invention to provide parameters for the spacing and notching configuration in the compression section of belts.

It is a further object of this invention to so configure notches in the compression section of belts as to relieve the stress concentration which is developed in the compression section of the belt.

It is still a further object of this invention to increase the horsepower rating of power transmission belts.

It is still a further object of this invention to increase the load-life capability of the belt.

It is a further object of this invention to provide a notching configuration in the compression section of belts whereby the likelihood of cracking in the compression section of the belt is minimized.

It is especially an object of this invention to minimize cracking that may occur in the notches themselves.

It is still a further object of this invention to minimize tearing of cogs which are formed by notching in the compression section of belts.

It is another object of this invention to enable belts to be used on minimum diameter sheaves.

These objects and advantages will become more apparent in the following detailed description when considered in connection with the accompanying drawings illustrating preferred embodiments of the present invention in which.

SUMMARY OF THE INVENTION

Figure 1:
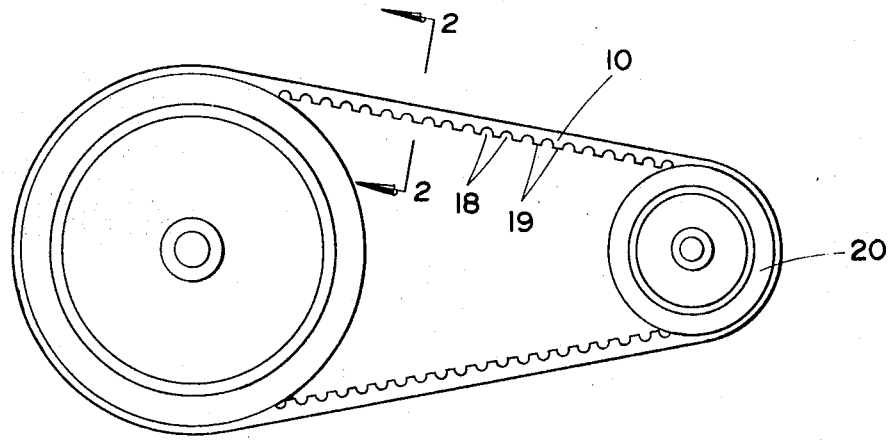
FIG. 1 shows a power transmission belt drive which is driven with a power transmission belt having notches in its compression section.

Mathematical relationships are given for determining notching configuration and spacing of such notches in the compression section of belts. Specific mathematical relationships are given for determining the notch depth, the apex radius and the spacing of the notches. The angle of the notch may also be defined but is of secondary importance compared to the other dimensions. Radii in all cases are kept to a maximum to increase undercord support and to eliminate sharp corners. Proper configuration allows for a greater undercord and compression material thereby increasing the lateral support and also tending to eliminate compression section cracking and undercord separation of belts. It is an incidental benefit derived from this section to significantly create a quieter drive and to allow the belts to accommodate smaller diameter sheaves.

TECHNICAL DISCLOSURE

Many belts 10 are typically truncated, V-shaped, in a cross-section 11. The most usual type of power transmission belt is commonly referred to as a V-belt. Motion and traction belts, however, are generally substantially rectangular in cross-section.

Typically, there are three significant portions to a belt. A compression section 12 forms the underbody portion of the belt and may comprise a high modulus stock. This stock may comprise a loaded gum or fiber-reinforced rubber. Immediately over the compression section 12 is the neutral axis 13 in which for power transmission belts are generally placed tensile members 14. Motion or traction belts may not have tensile members present. Tensile members 14 comprise a plurality of longitudinally spaced apart cords embedded in or between an overcord cushion 15 and undercord cushion 16. The overcord cushion 15 and undercord cushion 16 act as a supporting member for the tensile members 14. The overcord 15 and undercord 16 typically comprise a gum rubber suitably compounded and loaded with reinforcing material to the best advantage to obtain a sufficient degree of support to the tensile member 14 and to act as a unification or adhesion system for binding the cord or tensile member 14 intimately within the belt. On top of the neutral axis 13 and forming the top portion of the belt is a tension section 17.

It should be realized that throughout this invention, whenever the term rubber is used, it normally refers to natural or synthetic rubber or rubber-like compounds normally used in the V-belt art. Synthetic rubbers may include such materials as butadiene styrene, butadiene acrylonitrile copolymers, polychloroprenes, polyurethanes (but not necessarily fiber-loaded polyurethane) polybutadienes, polyisoprenes or blends of these materials with each other or with natural rubber.

A belt designed in accordance with the present invention is one in which in the compression section 12 is formed a series of notches 18 or indentations. Such a series of notches will form cogs 19 therebetween. The notches 18 are generally formed in a semi-circular cross-section with a radius R extending between adjacent cogs 19.

Such notches 18 are generally provided to allow the belt to rotate around smaller diameter sheaves 20. On such small diameter sheaves 20, one normally finds more severe stress concentrations imparted to the belt 10. The notching allows the belt 10 to rotate on such smaller sheaves 20; however, there may be a corresponding increase in stress concentration in the notches themselves. Accordingly, it is sometimes seen that the notches will exhibit cracking 21 or failure in the small or severe radius 22 or portion of the notch 18. Such cracking 21 may lead to premature failure of the belt 10. This is exhibited by a decrease in the low life capability of the belt. If such severe cracking occurs the cogs 19 may be sheared off. If such shearing of the cogs 19 is found, the belt will exhibit immediate failure. Even if the belt does not exhibit early failure, the cracking at 21 of the stress concentration in the belt 10 is an esthetically objectionable characteristic. Such cracking 21 may be cause for warranty adjustment prior to completion of the useful load-life capability of the belt. This invention, therefore, is directed toward minimization of cracking 21 in the notch 18 of the belt 10. The mode of failure of most previously notched belts 10 is characterized by such cracking 21 with a great likelihood of the cogs 19 pulling out as the cracking 21 progresses. Once the cracking 21 is initiated cracking becomes progressively more severe. A practical consequence of early cracking 21 results in a significant decrease of the load-life capability of the belt 10. The decrease of the load-life capability may result in the necessity of premature removal of the belt from drive.

Whereas the mode of failure of the notched belts previously known is severe compression section 12 cracking 21 or shearing out of the cogs 19, a notched belt 10 designed in accordance with the parameters established in this invention is characterized not be severe cracking 21 or cogs 19 pulling out, but rather with a deferred chafing or adhesion failure of the tensile member 14. The tensile members 14 may actually separate from the compression section 12 or from the tension section 17 of the belt. However, such adhesion failure does not generally occur until subsequent to the corresponding time of removal or failure of the normally notched belt. In other words, the belt 10 notched in accordance with this invention exhibits an increased load-life capability and increased usefulness. Longer satisfactory drives are obtained when transmitted with a belt 10 having notches defined by the parameters of the invention herein.

Testing of belts 10 constructed with parameters disclosed in accordance with the present invention indicates that a large apex radius, R, should be used to distribute stress concentrations over a greater area in a given notch 18. Thus, it has been found that it is desirable to describe a continuous large radial arc in the upper portion of the notch 18.

Testing has also shown that a maximum number of notches 18 should be provided in the compression section 12 of the belt to distribute the stress concentrations to a large number of notches 18 rather than to limit the stress concentration to a smaller number of noches. Thus, spacing between notches is less than is normally found in previously notched belts. The spacings, S, are controlled by minimizing the notch width, W$n$, and the cog width, W$c$.

Figures 2, 3:
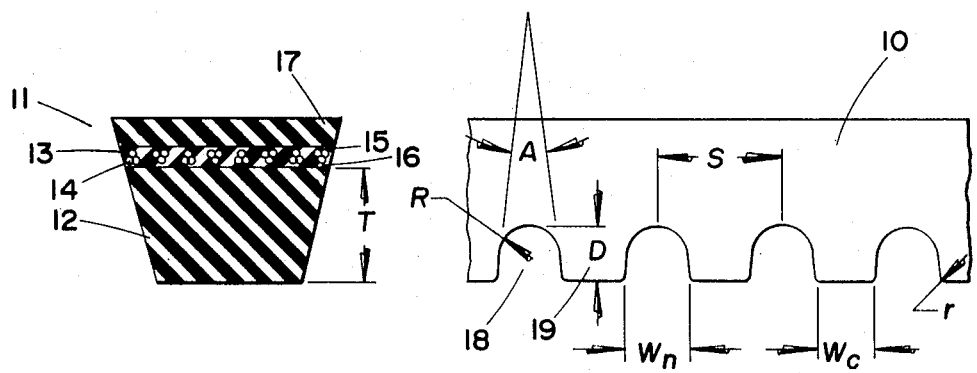
FIG. 2 shows a cross-section of a V-belt taken along the plane 2—2.
FIG. 3 shows a side view of a belt notched according to the design parameters of this invention.

Notches having a minimum notch depth, D, should be used since it is desirable to utilize an adequate amount of compression material or optimum lateral support to the belt. A sufficient amount of compression section should be retained to assure that the compression section between the upper portion of the notch 18 as described by the notch depth, D, and the neutral axis 13 shall not be so weakened as to be insufficient to provide adequate lateral support to the belt. A belt generally comprises a given compression section thickness, T, which can be measured from the neutral axis 13 to the bottom of the rib section of the belt. For instance, in a V-belt the compression thickness, T, would be to the bottom of the truncation and extending up to the undercord section 16. In a compression section 12, a notch 18 may be formed by either directly molding a notch into the belt or cutting the notch into the compression section 12. A notch depth is measured from the top of the apex to the bottom of the belt as shown in FIG. 3 and denoted as D. The remaining portion of the compression section 12 which is available for lateral support to the belt is then measured as $(T-D)$. The figures are in relative scale to one another. It can be seen that there is generally greater thickness $(T-D)$, of the remaining compression section 12 in the new concept as described herein as compared to the compression section of the previously notched belts. The greater thickness $(T-D)$ of the remaining compression section of the present invention lends to greater lateral support.

The spacing, S, of the notch itself is also of great importance. Generally the belt, according to the present invention, is characterized by narrower notch widths which are indicated by W$n$. The cog width intermediate the belt is designated as W$c$ and is generally much narrower than the cog widths, W$c$, of previous belts. The practical effects of this is to make for a much smaller cog width, W$c$, in the present invention when compared to belts previously made. The spacing, S, of notches according to the present invention is therefore considerably less than the spacing of notches of previous belts. Thus, the stress is distributed across a larger number of notches according to the present invention, thereby minimizing likelihood of compression section cracking 21. In essence, therefore, within a given length of belt there are a significantly greater number of notches in the present invention as compared to belts previously made.

It is known in the art that it is sometimes desirable to make a random notching of the belt to decrease the likelihood of a generation of harmonic or resonant noise created as the notch hits the sheave surface. The belt, according to the present invention, is as adaptable to such random spacing as previous belts, if desired.

As previously discussed to some degree, belts of the present invention are characterized by two significant factors. The first factor is that within a given belt length there is a significantly larger number of notches as compared to previously notched belts. This factor is important in that the stress concentrations created can be distributed over a greater surface area. In other words, the stress concentrations are distributed among a larger number of notches. Therefore, there is less likelihood to induce cracking in a given notch since the stress concentration is far less according to this invention. The second significant factor is that the tensile support under the notch as measured by $(T-D)$ is much greater according to the parameters set forth in the present invention as belts previously notched. This greater remaining compression section $(T-D)$ in the notch area gives significantly greater support to tensile members 13 or to lateral stiffness, thereby prolonging or extending the load-life capability of the belt. Because of the increased support remaining in the compression section it is felt that again there can be a greater distribution of dynamic stresses which may be created. These stress forces can be distributed over a greater matrix portion of the belt, therefore minimizing concentrated local areas of stress at which point failure may occur. Incidentally in addition to the increased support measured by the increased amount of compression section remaining $(T-D)$, there are almost twice as many notches in a given spacing as with previously notched belts.

Specific parameters have been developed for defining the various notching spacings and dimensions. Though optimum parameters can be stated, there is a preferred range within which dimensions will give substantially increased performance. The preferred parameters and the acceptable ranges are set forth in Table I.

TABLE I

| Dimension | Optimum | Preferred limit |
|---|---|---|
| Notch depth (D″) | 0.6 × compression thickness (T) [1] | ± 0.300″ |
| Apex radius (″) | 0.02″+0.35×notch depth (D″) | ± 0.015″ |
| Notch spacing (S″) | 5.5×apex radius (R″)−0.107″ | ± 0.060″ |
| Notch angle (A°) | 32.0°−50°²/in.×notch depth (D″) | ± 1.5° |

[1] "T" expressed in inches.

As can be determined from Table I, the notch depth, D, should be defined to measure essentially equal to 0.6 times the compression thickness, T, expressed in inches. The acceptable range may increase or decrease the notch depth, D″, within a tolerance of 0.030 inch. The apex radius, R, is defined as being equal to the distance from the top of the notch curve to a point where the radius may be struck to define the arc portion of the apex of the notch. The apex radius, R″, is preferably substantially 0.02+0.35 times the cog depth, D″. The preferred range may be expanded to have a tolerance of ±0.015 inch.

The spacing of the notches from one another as measured by a distance of apex to apex or any other reference position of adjacent notches is described as being essentially equal to 5.5 times the apex radius R″ minus a constant of 0.107″. Here again, a preferred range may increase or decrease the spacing by 0.060″. Finally, the angle, A°, of the notch may be determined to be essentially equal to 32.0° minus 50°/in. times the notch depth, D″. This angle can vary with a plus or minus tolerance of 1.5°.

Though parameters are given for four dimensional factors, three of these, namely the notch depth, D″; the apex radius, R″; and the notch spacing, S″, are of prime importance. These three dimensions are controlling as far as distributing the stresses and minimizing the concentrations to a greater number of notches and over a greater apex surface. The method of defining notch angle, A, is also given for purposes of completing the notching parameters but is only of secondary importance as far as minimizing the crack generation. As a matter of fact, practical limits of the notch angle, A, will result by first defining the three controlling dimensions.

Of course, the parameters can preferably be stated in terms of dimension units. To accomplish this, a constant, $k$, having dimensions of units per inch can be utilized to obtain whatever units of measure may be desired, whether the units are in metric or English units. Thus, Table II shows essentially the same parameters as Table I with the conversion constant, $k$, inserted. The parameters are all basically established on the compression thickness and the suitable conversion factor, $k$, is utilized where $k$ is an expression of units in terms of the expression of the compression thickness, T.

TABLE II $$D = 0.6T$$
$$R = 0.02k + 0.35D$$
$$S = 5.5R - 0.107k$$
$$A = 32.0° - 50kD$$

Figures 4, 5:
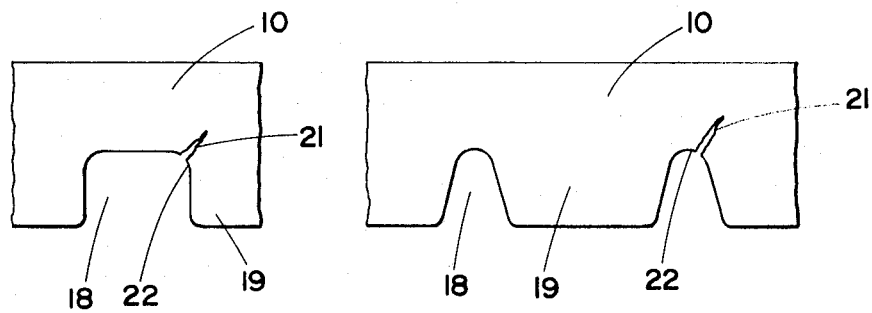
FIG. 4 shows a typical type of compression section cracking of the belt notched in a previously known configuration.
FIG. 5 shows another typical type of compression section cracking of a belt notched in another previously known configuration of the notch in the compression section.

For purposes of illustration, refer to FIGS. 3 and 5 which are drawn approximately to scale. It can be seen that the spacing, S, of the notches of FIG. 3, which is an embodiment of the invention herein, shows much shorter spacing of the notches that does the previous embodiment as shown in FIG. 5. For instance, in an automotive design drive belt having a nominal 3/8″ top width with a 42″ outside circumference and an equivalent length belt, the previous embodiment may have ten notches present. A belt of the new embodiment would have approximately 17 notches in the same belt length. Specifically, such a belt of 3/8″ top with a 42″ circumference according to the present invention and as previously known in the art would have notching configurations substantially as set forth in Table III.

TABLE III

| Dimension | According to invention | Previous |
|---|---|---|
| Notch depth, D, inch | 0.100 | 0.140 |
| Apex radius, R, inch | 0.059 | 0.050 |
| Notch spacing, S, inch | 0.234 | 0.400 |

Though the notch angle, A, is of interest but of not so great importance since it will more or less conform to allowable concepts, the same belt in accordance with the present invention has a notch angle of substantially 26° whereas belts of previously notched concepts would have a notch angle of 36°.

A comparison of the load-life capacity between the two belts is even more dramatic if the belt is placed upon a typical automotive drive which may be typified by a three-point water brake unit in which the smallest sheave is 2.0 inches in diameter with a horsepower application of 12 horsepower. A belt with the previous type notches would show a life expectancy of slightly over 200 hours. For instance, one belt made in accordance with the normal method of notching showed an actual life testing of 204.5 hours. With this belt at a point of the total drive of 118 hours or about 60% of the total life of the belt, notch cracking occurred which became more severe as the testing continued. The cracking eventually led to edge cord separation with an ultimate tensile cord failure at slightly more than 200 hours life. From the point of first cracking the cracking became more progressively worse until the time of failure.

Other belts having the exact construction except for notching applied in accordance with the parameters set forth in this invention on the same testing application showed an increase of load-life capacity of anywhere from 15% to about 30%. For instance, a belt having the same dimensions except for the notching applied to the same testing conditions gave a load-life capacity of over 235 hours. At no time in the drive did any compression section cracking 21 occur. Another belt which showed a 30% increase load-life capacity also exhibited no cracking except at a point in time just prior to the ultimate failure of the belt. As was stated, this belt showed a life at a 12 horsepower load running over a smallest diameter sheave of 2.0 inches, of slightly over 260 hours for a 30% load-life capacity increase. Similar data is obtained for belts made within the preferred range of spacing and notching parameters set forth.

What is claimed is:
1. In a method of relieving dynamic stress concentrations in a belt formed of a compression section having a thickness, T, expressed in inches, a tension section and a neutral axis between said tension and compression sections, the improvement comprising the steps of:
   forming substantially triangular notches having an apex and two sides into the compression section to a depth, D, substantially 0.6 times T;
   radiusing said apex portion of the notches a distance, R, of substantially 0.020″ plus 0.35D;
   spacing each notch a distance, S, apart from one another along the direction of travel of the compression section of the belt a distance of substantially 5.5R minus 0.107 inch.

2. The method of the improvement of relieving dynamic stress concentrations in a belt according to claim 1 including the additional step of:

forming from said notch sides an included notch angle, A°, from the notch apex of substantially 32.0° minus 50°/in. D.

3. The method of the improvement of relieving dynamic stress concentrations in a belt according to claim 2 in which the preferred range of the notch depth is between 0.6T plus 0.03" and 0.6T minus 0.03"; the radius distance having a preferred range of 0.035" plus 0.35D and 0.005" plus 0.35D; the spacing, S. having a preferred range of 5.5R minus 0.167" and 5.5R minus 0.047" and a notch angle having a preferred range of from 33.5° minus 50°/in. D and 30.5° minus 50°/in. D.

4. In a method of relieving dynamic stress concentrations in a belt formed of a compression section having a thickness, T, a tension section and a neutral axis between said compression and tension sections, the improvement comprising the steps of:

forming substantially triangular notches having an apex and two sides extending from the apex in the compression section to a depth, D, of substantially 0.6T;

radiusing said apex portions of the notches a distance, R, of substantially 0.020$k$ plus 0.35D;

spacing each notch a distance, S, apart from adjacent notches measured from equivalent points on the compression section along the direction of travel of the compression section of the belt a distance of substantially 5.5R minus 0.107$k$;

wherein $k$ is a conversion factor to convert the measure into the particular units in which T is measured and $k$ has a dimension of units per inch.

5. The method of the improvement of relieving dynamic stress concentrations in a belt according to claim 4 including the additional step of:

forming an included notch angle, A, from said sides extending from the apex of substantially 32.0° minus 50$k$D.

6. In a belt formed of a compression section having a thickness, T, a tension section and a neutral axis between said tension and compression sections and a plurality of spaced apart notches disposed in the compression section of the belt, the improvement comprising:

a plurality of substantially triangular notches having an apex disposed in the upper portion of said compression section and two sides extending from said apex into the compression section, said notches having a measure of a depth, D, from the apex to the bottom of the compression section of substantially 0.6T;

a radius distance, R, describing said apex portions of the notches of substantially 0.020$k$ plus 0.35 D;

a spacing, S, between adjacent notches measured from equivalent points of adjacent notches along the direction of travel of the belt a distance of substantially 5.5R minus 0.107$k$;

wherein $k$ is a correction factor to convert the measure to the particular units expressed and has a dimension expression of "units per inch."

7. The improvement of a belt according to claim 6 in which the notch angle, A, formed from the included angle between the two sides extending from the apex of the notch of substantially 32.0° minus 50$k$D.

8. The improvement of a belt according to claim 7 in which the preferred range of the notch depth, D, is between 0.6T plus 0.3$k$ and 0.6T minus 0.03$k$; the notch radius, R, having a preferred range of 0.35$k$ plus 0.35D and 0.005$k$ plus 0.35D; a preferred spacing, S, having a range of 5.5R minus 0.167$k$ and 5.5R minus 0.047$k$; and a preferred notch angle, A, range of from between 33.5° minus 50D and 30.5° minus 50D.

9. In combination with a driving and driven sheave rotatable about substantially parallel shafts, said sheaves providing a complementary surface section to accommodate the bottom of a compression section of belts; and at least one belt trained over said driving and driven sheaves, said belts formed of a compression section having a thickness, T, a tension section and a neutral axis between said tension and compression sections, said belts comprising:

a plurality of notches having an apex and two sides extending from said apex formed in the compression section of the belts to a depth, D, from the notch apex to the bottom of the compression section in which D is a preferred distance of between 0.6T plus 0.03$k$ and 0.6T minus 0.03$k$;

a radius, R, forming the notch apex in which R has a preferred range of from 0.035$k$ plus 0.35D and 0.005$k$ plus 0.35D;

a spacing distance, S, between adjacent notches measured from equivalent points of adjacent notches having a preferred range of 5.5R minus 0.167$k$ and 5.5R minus 0.047$k$;

and notch angles, A, formed from the apex and two sides extending from the apex having a preferred range of 33.5° minus 50D and 30.5° minus 50D;

in which $k$ is a conversion factor for expressing the dimensions in units measured and has a dimension of units per inch.

10. In a belt formed of a compression section having a thickness, T, expressed in inches, a tension section and a neutral axis between said tension and compression sections and a plurality of spaced apart notches disposed in the compression section of the belt, the improvement comprising:

a plurality of substantially triangular shaped notches each of said notches having an apex disposed in the upper portion of said compression section and two sides extending from said apex, said notches having a measure of depth, D, in the compression section of substantially 0.6T;

a radius distance, R, forming said apex portion of each notch of substantially 0.020" plus 0.35D;

a spacing, S, between adjacent notches measured from equivalent points of adjacent notches along the direction of travel of the belt a distance of substantially 5.5R minus 0.107".

11. The improvement of a belt according to claim 10 having additionally a notch angle, A, formed between the two sides of the notch extending from the apex in which the included angle is substantially 32.0° minus 50°/in.D.

12. The improvement of a belt according to claim 11 in which the preferred range of the notch depth is between 0.6T plus 0.03" and 0.6T minus 0.03"; the notch radius, R, is a distance having a preferred range of between 0.035" plus 0.35D and 0.005" plus 0.35D; a preferred spacing, S, having a preferred range of between 5.5R minus 0.167" and 5.5R minus 0.047"; and a notch angle having a preferred range of between 33.5° minus 50D and 30.5° minus 50D.

References Cited
UNITED STATES PATENTS

| | | | |
|---|---|---|---|
| 3,242,750 | 3/1966 | Graft | 74—234 |
| 3,016,756 | 1/1962 | Jäckel | 74—234 |

LEONARD H. GERIN, Primary Examiner

U.S. Cl. X.R.

74—230.17 S, 234